F. A. DIFFENDERFER.
ROLLER COTTON GIN.
APPLICATION FILED NOV. 8, 1910.
1,018,302.
Patented Feb. 20, 1912.
2 SHEETS—SHEET 2.
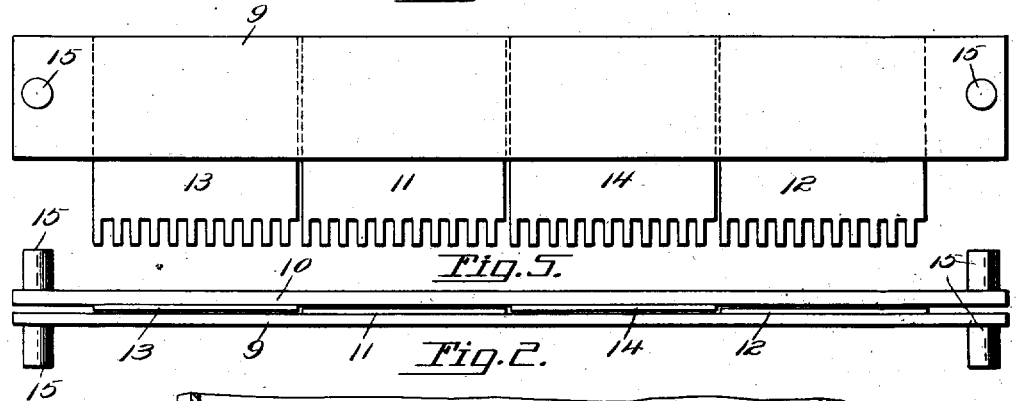
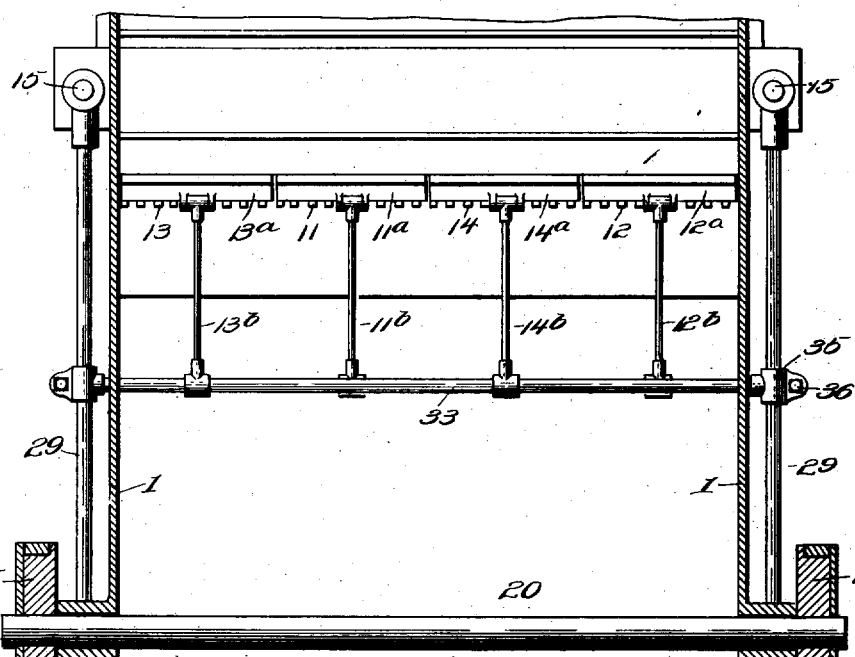
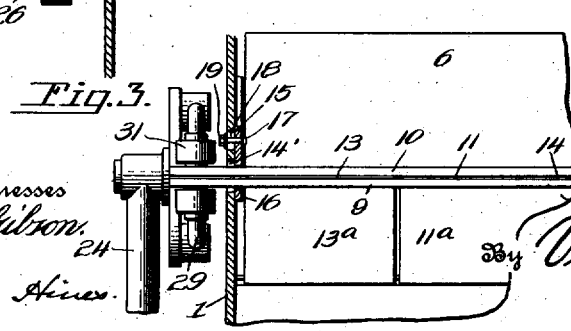
Inventor
Francis A. Diffenderfer.
Witnesses
F. L. Gibson.
C. C. Hines.
By Victor J. Evans
Attorney

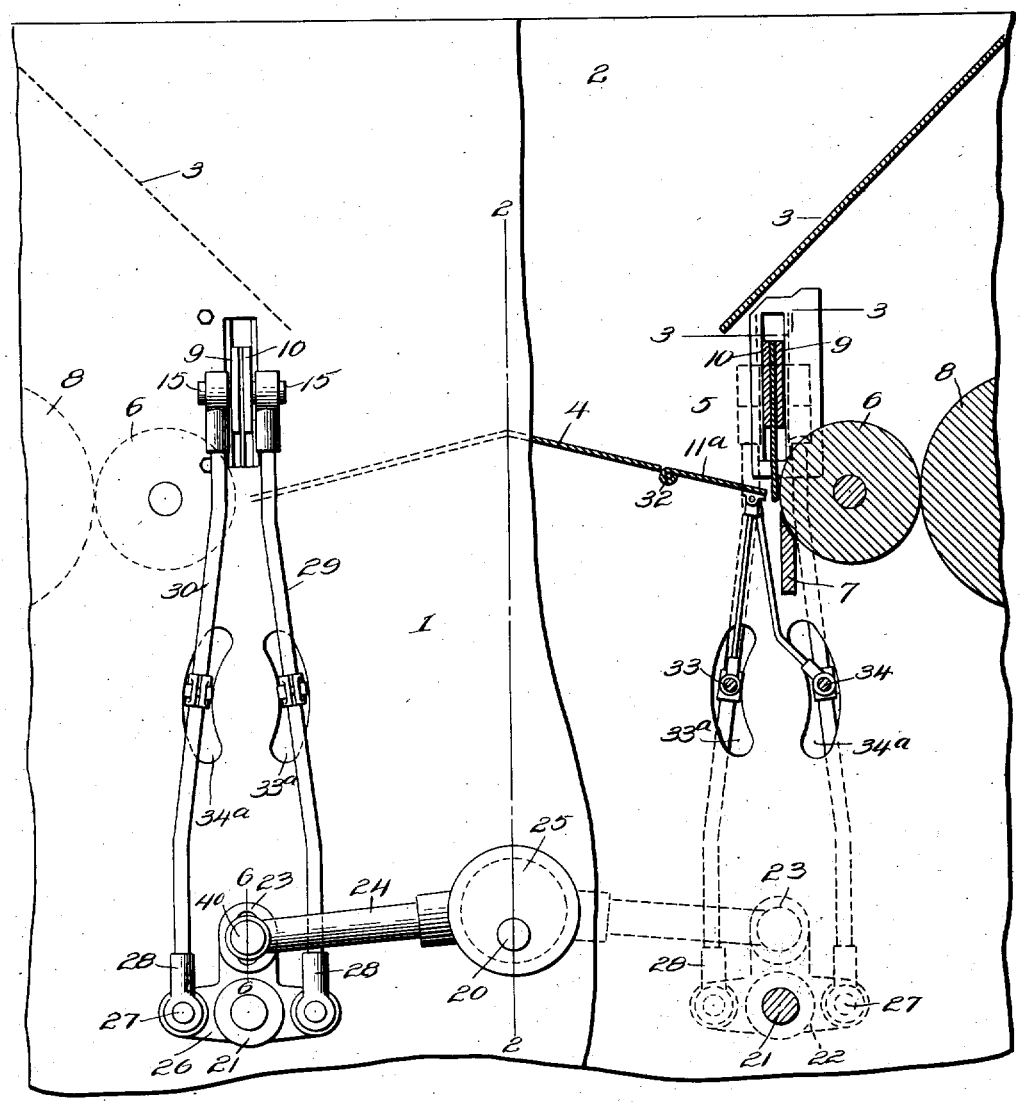
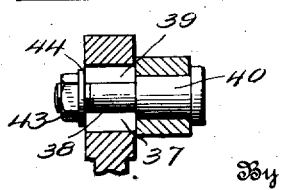

UNITED STATES PATENT OFFICE.

FRANCIS A. DIFFENDERFER, OF BROOKLYN, NEW YORK, ASSIGNOR, BY MESNE ASSIGNMENTS, TO MARY E. DIFFENDERFER, OF BROOKLYN, NEW YORK.

ROLLER COTTON-GIN.

1,018,302.     Specification of Letters Patent.     Patented Feb. 20, 1912.

Application filed November 8, 1910. Serial No. 591,230.

*To all whom it may concern:*

Be it known that I, FRANCIS A. DIFFENDERFER, a citizen of the United States, residing at Brooklyn, in the county of Kings and State of New York, have invented new and useful Improvements in Roller Cotton-Gins, of which the following is a specification.

This invention relates to roller cotton gins, and its primary object is to provide a ginning mechanism involving the use of a novel construction and arrangement of reciprocating cleaning combs in conjunction with the ginning roll and doctor blade of the machine for stripping the seed from the lint, said combs having a mode of operation of a character to secure a thorough and effective separation without crushing or otherwise injuring the seed or tearing, cutting or otherwise shortening the fibers of the cotton.

A further object of the invention is to provide means for regulating the stroke of the combs and adjusting the same to operate in varied relation to the doctor blade and exposed surface of the roll as occasion may require to suit the nature and length of the staple to be treated, whereby staple of any length may be ginned without injury to fiber or seed or balling of the staple.

A still further object of the invention is to provide means for agitating the staple so as to loosen up the fiber and seed, whereby the passage of the combs through the staple is facilitated and the free and ready discharge of the separated seed secured.

The invention consists of the features of construction, combination and arrangement of parts, hereinafter fully described and claimed, reference being had to the accompanying drawings, in which:—

Figure 1 is a fragmentary view, partly in side elevation and partly in vertical longitudinal section, of a roller cotton gin embodying my invention. Fig. 2 is a vertical transverse section on the line 2—2 of Fig. 1. Fig. 3 is a sectional plan view on the line 3—3 of Fig. 1. Fig. 4 is a view in front elevation of the cleaning combs. Fig. 5 is a top plan view of the combs showing the same slightly separated for convenience of illustration. Fig. 6 is a detail section on the line 6—6 of Fig. 1.

Referring to the drawings, 1 designates the side walls of the frame of a roller cotton gin of the double-gin type, in which duplicate sets of ginning devices are provided on opposite sides of the transverse center of the machine, said devices being fed from a common central hopper 2, the bottom walls 3 of which terminate above a guide shelf 4 to provide intervening feed throats or passages 5, said shelf being inclined downwardly and outwardly from its center toward the respective throats to facilitate the feed of the staple to the ginning devices. While I have shown the application of the invention to a double gin of the character disclosed, it will, of course, be understood that the essential features of the invention may be embodied in machines having but a single set of ginning devices or more than two sets, as desired.

Each set of ginning devices includes a ginning roll 6, a coöperating doctor blade 7 and a doffer roll 8, the roll 6 being arranged to present a portion of its surface at the base of the throat or passage to gather the cotton and draw it downwardly into contact with the edge of the doctor blade and finally between the adjacent faces of said roll and blade. The doffer roll is arranged to perform its usual function of clearing the ginning roll of the fiber, and such parts of the mechanism may be driven in any suitable manner.

Arranged for coöperation with the roll 6 and blade 7 is a pair of cleaning combs 9 and 10, mounted to reciprocate in a vertical plane at the inner end of the throat 5 and above the roll 6, the lower edges of said combs operating in the space between the adjacent edge of the shelf and surfaces of the doctor blade and roll to separate the seed and refuse matter from the fiber. Each of said combs consists of an elongated transversely extending carrier plate or bar having secured thereto comb plates spaced at suitable intervals apart, the bar of the comb 9 being illustrated as provided upon its rear face with a pair of spaced comb plates 11 and 12, while the bar of the comb 10 is similarly provided upon its front face with spaced comb plates 13 and 14. The comb plates are thus mounted at their upper ends upon the meeting faces of the bars, to which they may be screwed or otherwise suitably attached, and their lower toothed ends project below the bar, the comb plates being staggered or alternating in arrangement upon the bars across the throat or passage.

The ends of the bars project outwardly through vertical slots 14ª in the side walls 1 and are provided with laterally projecting wrist pins or studs 15. The slots 14ª are of a length to permit the cleaning combs to have the desired range of vertical reciprocatory motion and are of greater width than the combined width of said combs to permit of the adjustment of the latter in a direction toward or from the face of the roll to vary the working relationship of the toothed edges of the comb plates with respect to the roll and doctor blade. For the purpose of securing movement of the combs in a true path, guide plates 15ª are mounted upon the walls 1 and formed with guide slots 16 through which the combs pass, and which are of just sufficient width to permit the combs to reciprocate freely therein. Each guide plate is secured to the adjacent wall 1 by one or more bolts 17 passing through slots 18 and provided with a clamping nut and washer 19, whereby the guide plate may be adjusted for the purpose described and secured in adjusted position.

Journaled in the side walls 1 is a transversely extending drive shaft 20, and arranged on each side of said shaft and parallel therewith for coöperation with the adjacent set of ginning devices is a rock shaft 21, to which is suitably secured a T-shaped rocker lever 22 disposed in an inverted position thereon, the central upwardly extending arm 23 of said lever being connected by a rod 24 with an eccentric 25 on the shaft 20, whereby in the operation of the apparatus a rocking motion is imparted to the shaft 21. For convenience in the construction of the gin and arrangement of the working devices, the rocker lever, eccentric and connections for operating one of the sets of ginning devices are disposed at one side of the frame, as shown in full lines in Fig. 1, while the corresponding parts for operating the other set of ginning devices are disposed at the opposite side of the frame, as illustrated in dotted lines in Fig. 1.

The laterally extending arms 26 of each rocker lever have pivotally connected therewith, as at 27, socket members 28 which are internally threaded to receive the lower externally threaded ends of connecting rods 29 and 30, the upper ends of which rods are externally threaded to engage socket members 31 pivotally engaging the studs 15 of the comb bars, the sets of rods 29 and 30 respectively connecting the opposite arms 26 of the two rocker levers on the opposite ends of the shaft 21 with the wrist pins on the opposite ends of the respective comb bars 9ª and 10ª. By this construction it will be obvious that in the operation of each set of ginning devices the cleaning combs 9 and 10 will be successively and alternately reciprocated up and down, the comb 9 moving downward while the comb 10 is moving upward, and vice versa, by which operation the toothed edges of the plates of each comb alternately pass downward between the edge of the guide shelf and the roll and doctor blade and comb out the staple while it is being drawn by the roll between said roll and the blade, as a result of which the seed will be loosened and separated from the staple, and the latter also cleaned by the combing action of all other foreign particles.

In order to loosen up the staple to enable it to be readily taken up by the roughened surface of the roll 6, as well as to secure an effective displacement and discharge of the loosened seed, the lower portion or discharge edge of each inclined section of the guide shelf 4 is formed of a series of agitator plates 11ª, 12ª, 13ª and 14ª, equal in number and corresponding in arrangement to the comb plates 11, 12, 13 and 14 of the cleaning combs and arranged respectively below the said comb plates. These agitator plates are pivotally mounted upon a rod 32, and the plates 11ª and 12ª are connected by connecting rods or links 11ᵇ and 12ᵇ with a transverse rod 33, while the agitator plates 13ª and 14ª are similarly connected by connecting rods or links 13ᵇ and 14ᵇ with a transverse rod 34. The rods 33 and 34 have their ends projecting exteriorly through and movable vertically in arcuate guide slots 33ª and 34ª formed in the side walls 1 and provided with clips 35 which respectively engage the adjacent rods 29 and 30 and are adapted to be clamped thereto by screws 36, whereby in the operation of the cleaning combs reciprocatory motion will be simultaneously imparted to the agitator plates. By means of the clips 35 the rods 33 and 34 are adjustably connected with the connecting rods 29 and 30 to vary the vibratory motion of the agitator plates, and it will be observed that the construction and arrangement of the operating connections is such that when the comb plates 11 and 12 move downward the agitator plates 11ª and 12ª move downward therewith, while the comb plates 13 and 14 and agitator plates 13ª and 14ª simultaneously move upward, the coacting sets of comb plates and agitator plates thus being arranged to simultaneously move in the same direction and in the reverse direction to the other set of comb plates and agitator plates, so that the staple feeding to the roll will be constantly agitated and loosened up, preventing it from passing in a compact mass to the roll and choking between the roll and doctor blade. Such agitation of the staple also effects the ready and free release of the separated seed from the fiber, allowing the seed to drop by gravity into the bottom of the frame or casing, from which it may be removed in any suitable manner.

From the foregoing description, it will be understood that as the combs alternately move in opposite directions, each cleaning comb has a working movement in a downward direction and a non-working movement in an upward direction. On the downward movement of each comb the toothed edges of the comb plates carried thereby pass through the adjacent portions of the staple which are being drawn against the doctor blade by the roll, and thus free and separate the seed and refuse from the fiber, the latter passing in a cleanly condition to the roll. By this operation the seed are separated without injury thereto or to the cotton fiber, the seed remaining intact while the length of the fiber remains unimpaired, the combs acting without either crushing or cutting the seed or tearing or cutting the fiber, thereby overcoming the objections incident to the use of saw gins and roller gins in which cleaning or separating blades or knives are used. As each cleaning comb moves upwardly, the other cleaning comb moves downwardly, and the comb plates of the latter operate upon the portions of the staple left untreated by the comb plates of the former, the reciprocating action of the cleaning combs being rapid enough to prevent the passage of any untreated cotton to the roll. Owing to the staggered arrangement of the comb plates hereinbefore described, and the simultaneous movement of the combs in opposite directions, it will be apparent that both the power mechanism and the cotton will be relieved from the strain of the passage of the combs through out the entire body of cotton at one time, and that as a consequence a balanced action of the cleaning mechanism will be secured, reducing the amount of power required to operate the machine without reducing the efficiency of the apparatus, and at the same time preventing too much resistance being set up to the drawing in of the cotton by the roll, whereby the fiber is liable to be torn or injured. As a matter of fact, the described action of the combs gins the cotton much more rapidly than any construction with which I am familiar involving the use of combs or blades operating in other ways, and, hence, increases the ginning capacity of the machine. Through the use of the agitating devices operating in conjunction with the combs, the seeds and fiber are also tossed about and the seed separated for discharge, while the fiber passes in a loosened condition to the roll, with obvious advantages.

In practice, the upper and lower ends of the rods 29 and 30 respectively have a right and left handed threaded engagement with the socket members 31 and 28, by which, through a rotary movement of the rods, the distance between their upper and lower pivotal connections may be varied or the effective length of the rods regulated to change the working relationship of the toothed edges of the comb plates of the reciprocating combs to the exposed surfaces of the doctor blade and the roll, which adjustment in connection with the adjustment afforded by the guide plates 15$^a$ enables the combs to be set to operate as close to or far from the upper edge of the doctor blade and exposed surface of the roll as desired to suit different contingencies of service. In order to enable the throw of the combs and agitators to be varied, each connecting rod 24 is adjustably coupled to the arm 23 of the associated rocker lever 22. As illustrated in Figs. 1 and 6, the arm 23 is provided with an elongated vertical slot 37 to receive the reduced end 38 of a pivot bolt 39, which has an enlarged portion 40 pivotally engaging an eye 41 on the end of the connecting rod 24, said enlarged portion being provided with a retaining head 42. The end 38 of the bolt is coextensive in width with the slot 37 but is adapted to be adjusted vertically therein to vary its distance from the shaft 21, whereby the throw of the lever and the parts above described may be varied in an obvious manner. The reduced end of the bolt is provided with a clamping nut 43 and washer 44, which bridge across one side of the slot 37, while the eye 41 bridges across the opposite side of the slot, whereby the pivot bolt may be clamped in an adjusted position. This connection permits of a sensitive adjustment to change the throw or range of motion of the cleaning combs as occasion may require to suit the nature and length of the staple, whereby balling of the staple will be prevented.

While the cleaning combs and agitating devices may be employed in conjunction with each other, I do not restrict the invention to the use of the particular kind of agitating devices employed in connection with the combs, or to any other particular type of agitating means in connection with the combs, as the combs may be employed under some conditions and for some purposes independently of any agitating mechanism.

Having thus described the invention, I claim:—

1. In a roller cotton gin, a ginning roll, a doctor-blade arranged on one side of the drawing-in portion of the roll, cleaning combs arranged on the opposite side of the drawing-in portion of the roll, and movable on their working action toward the blade and across said portion of the roll, said combs being arranged in sets, with the combs of each set coupled to move to like degrees in unison, and means for simultaneously reciprocating the sets of combs to like degrees in opposite directions, to correspondingly advance one set of combs and retract the other set of combs.

2. In a roller cotton gin, a ginning roll, a doctor-blade disposed on one side of the drawing-in portion of the roll, a series of combs disposed on the opposite side of the drawing-in portion of the roll and arranged end to end in longitudinal alinement, said combs being coupled to provide oppositely movable sets coöperating with said roll and blade, the combs of one set alternating in arrangement with the combs of the other set, and means for simultaneously reciprocating said sets of combs in opposite directions, to advance one set and retract the other set.

3. In a roller cotton gin, a cleaner comprising a bar or plate carrying spaced combs, a second bar or plate carrying spaced combs arranged between and alternating with the first-named combs, and means for simultaneously reciprocating said bars in opposite directions, to advance one set of combs and retract the other.

4. In a roller cotton gin, a cleaner comprising a longitudinal series of combs arranged end to end in sets and all movable in the same direction for a working action, bars carrying said sets of combs, and means connected with said bars for simultaneously moving one set of combs in the direction of their working movement and the other set of combs to an equal degree in the direction of their return movement, and vice versa.

5. In a roller cotton gin, a cleaner comprising a series of combs arranged in alinement with each other and all movable in the same direction for working action, said combs alternating in separate sets with the combs of each set coupled to move to like degrees in unison, and means for simultaneously reciprocating the combs of the different sets to like degrees in opposite directions, to advance one set of combs and retract the other set of combs.

6. In a roller cotton gin, a pair of cleaners each comprising a carrier, and combs upon the carriers alternating in arrangement with each other, with means for simultaneously reciprocating said carriers in opposite directions, to advance the combs of one cleaner and retract the combs of the other cleaner.

7. In a roller cotton gin, a pair of parallel carrier bars, a plurality of combs upon the meeting faces of the bars, the combs upon one bar being arranged to work between the combs upon the other bar, and operating mechanism for simultaneously reciprocating said bars in opposite directions.

8. In a roller cotton gin, the combination of a ginning roll, a doctor blade, carriers arranged above the drawing-in portion of the roll, combs upon the carriers arranged in alternating relation to operate in vertical parallel planes and movable downward for coöperation with the roll and doctor blade, and operating mechanism for simultaneously moving the combs upon one carrier downward on their working stroke and the combs upon the other carrier upward on their return stroke.

9. In a roller cotton gin, the combination of a ginning roll, two sets of cleaning combs arranged in a longitudinal series in alternation with each other and movable in the same direction for coöperation with the roll and blade, a drive shaft, a rock shaft disposed below the cleaning mechanism, an inverted T-shaped rocker lever upon the rock shaft, connecting rods between the horizontal arms of said lever and the sets of cleaning combs for reciprocating said combs in opposite directions simultaneously, an eccentric upon the drive shaft, and a rod connected with said eccentric and adjustably connected with the upright arm of the lever, whereby the working stroke of the latter may be varied.

10. In a roller cotton gin, the combination of a ginning roll, two sets of cleaning combs arranged in a longitudinal series in alternation with each other and movable in the same direction for coöperation with the roll and blade, a drive shaft, a rock shaft disposed below the cleaning mechanism, an inverted T-shaped rocker lever upon the rock shaft having its upright arm provided with an elongated longitudinal slot, connecting rods between the horizontal arms of said lever and the sets of cleaning combs for reciprocating said sets of combs in opposite directions simultaneously, a wrist pin adjustably mounted in the slot of the upright arm of the rocker lever, an eccentric upon the drive shaft, and a connecting rod between said eccentric and wrist pin.

11. In a roller cotton gin, the combination of a frame provided in its side walls with vertical slots, a ginning roll, a doctor blade coöperating therewith, a pair of parallel bars having their ends extending outwardly through said slots in the frame and adapted to reciprocate vertically and to be adjusted laterally therein, laterally adjustable guide plates upon the walls having slots for the passage of said bars, comb plates upon the bars arranged in alternating relation, and means connected with the projecting ends of the bars for simultaneously reciprocating the same in opposite directions.

12. In a roller cotton gin, the combination of a frame provided in its side walls with vertical slots, a ginning roll, a doctor blade coöperating therewith, a pair of parallel bars having their ends extending outwardly through said slots in the frame and adapted to reciprocate vertically and to be adjusted laterally therein, laterally adjustable guide plates upon the walls having slots for the passage of said bars, comb plates upon the bars arranged in alternating relation, a rock shaft, a rocker lever upon said shaft, connecting rods between the arms of said lever and adjacent outwardly projecting ends of the bars, whereby upon the motion of the shaft the bars will be reciprocated in opposite directions simultaneously, and means for operating the rock shaft.

13. In a roller cotton gin, the combination of a frame, a ginning roll, a doctor blade coöperating therewith, a pair of parallel bars, combs carried by the bars for coöperation with the roll and blade, the combs upon the respective bars being arranged to operate alternately between each other, slotted guide plates carrying the bars and adjustably secured to the frame for varying the path of movement of the combs with relation to the coöperating portion of the surface of the roll, and means connected with the bars for simultaneously reciprocating the same in opposite directions.

14. In a roller cotton gin, a ginning roll, a doctor-blade disposed at one side of the drawing-in portion of the roll, a cleaner comprising sets of combs arranged on the opposite side of the drawing-in portion of the roll, said combs being arranged end to end in longitudinal alinement, supports connecting the combs in sets, the combs of one set alternating in arrangement with the combs of the other set, means for conjointly adjusting the two sets of combs for varying the path of movement of the combs with relation to the drawing-in portion of the roll, and means for simultaneously reciprocating the two sets of combs in opposite directions, to advance one set of combs and retract the other.

15. In a roller cotton gin, a ginning roll, a doctor-blade arranged below the drawing-in portion, of the roll, a plurality of sets of cleaning combs arranged above the drawing-in portion of the roll, said combs being movable downwardly on their working action toward the doctor-blade and drawing-in portion of the roll, and means for simultaneously reciprocating the said sets of combs in opposite directions, to advance one set and retract the other.

16. In a roller cotton gin, the combination of a frame having a feed throat or passage, a ginning roll presenting a portion of its surface at the base of said passage, a doctor blade coöperating with said portion of the roll, two sets of comb plates movable in their working action across the throat and toward the roll and doctor blade, the comb plates of each set being arranged in alternation with each other, vertical movable agitators at the base of the throat corresponding in number and arrangement with the comb plates, and mechanism for reciprocating one of the sets of comb plates and the associated agitators in one direction and the other set of comb plates and agitators in the opposite direction simultaneously.

17. In a roller cotton gin, the combination of a frame having a feed throat or passage, a ginning roll presenting a portion of its surface in line with said passage, a doctor blade arranged for coöperation with the roll, two sets of comb plates movable in the same direction on their working action across the throat and toward the roll and doctor blade, the comb plates of each set being arranged in alternation with each other, vertically movable agitators at the base of the throat arranged in sets for coöperation with the sets of comb plates, a rock shaft, a rocker lever carried by said shaft, connecting rods between the arms of the lever and the sets of comb plates, and operating connections between the respective rods and the sets of agitators for operating each set of agitators with the associated set of combs.

18. In a roller cotton gin, a ginning roll, a doctor-blade arranged below the drawing-in portion of the roll, sets of cleaning combs arranged above the drawing-in portion of the roll and movable in their working action toward the roll and doctor-blade, the combs of each set being arranged in alternating relation, agitators corresponding in number and arrangement with the cleaning combs, and means for reciprocating one of the sets of combs and the associated agitators in one direction and the other set of combs and associated agitators in the opposite direction simultaneously.

19. In a cotton gin, a ginning roll, a doctor-blade, two sets of comb plates movable in the same direction on their working action toward the roll and doctor-blade, the comb plates of each set being arranged in alternation with each other, vertically movable agitators arranged in sets for coöperation with the sets of comb plates, and mechanism for reciprocating one of the sets of comb plates and the associated agitators in one direction and the other set of comb plates and the associated agitators in the opposite direction simultaneously.

20. In a cotton gin, a ginning roll, a doctor-blade arranged for coöperation with the roll, two sets of comb plates movable in the same direction on their working action toward the roll and doctor-blade, the comb plates of each set being arranged in alternation with each other, vertically movable agitators arranged in sets for coöperation with the sets of comb plates, a rock shaft, a rocker lever carried by said shaft, connecting rods between the arms of the lever and the sets of comb plates, and connecting rods between the aforesaid connecting rods and the sets of agitators for operating each 21. In a cotton gin, a ginning roll, a doctor-blade, two sets of comb plates movable in the same direction on their working action toward the roll and doctor-blade, the comb plates of each set being arranged for alternation with each other, vertically movable agitators arranged in sets for coöperation with the sets of comb plates, a rock shaft, a rocker lever carried by said shaft, connecting rods between the arms of the lever and the sets of comb plates, and connecting rods between the agitators and the first-named connecting rods for operating each set of agitators with the associated set of combs, said rods being adjustably connected to vary the working motion of the agitators.

22. In a cotton gin, a ginning roll, a doctor-blade, two sets of comb plates movable in the same direction on their working action toward the roll and doctor-blade, the comb plates of each set being arranged in alternation with each other, vertically movable agitators arranged in sets for coöperation with the sets of comb plates, a drive shaft, a rock shaft, a T-shaped rocker lever on said rock shaft having laterally extending arms and a vertical arm, connecting rods between the laterally extending arms of the lever and the sets of comb plates, connecting rods between the first-named rods and the sets of agitators for operating each set of agitators with the associated set of comb plates, and an operative connection between the drive shaft and vertical arm of the rocker lever for rocking the rock shaft and lever, said connection being adjustably coupled to said vertical arm, whereby the throw of said arm may be varied.

23. In a roller cotton gin, a cleaner comprising a set of spaced combs, a second set of spaced combs arranged between and alternating with the first-named combs, and means for simultaneously reciprocating said sets of combs in opposite directions, to advance one set of combs and retract the other, said means operating to move the sets of combs to equal degrees in opposite directions and the combs of each set to equal degrees in the same direction.

In testimony whereof I affix my signature in presence of two witnesses.

FRANCIS A. DIFFENDERFER.

Witnesses:
E. D. MILLER,
FREDK. A. WULF.

Copies of this patent may be obtained for five cents each, by addressing the "Commissioner of Patents, Washington, D. C."